(12) United States Patent
Xu et al.

(10) Patent No.: US 10,972,601 B2
(45) Date of Patent: *Apr. 6, 2021

(54) SYSTEMS AND METHODS FOR CONTROLLING ACCESS TO A COMPUTING DEVICE

(71) Applicant: Citrix Systems, Inc., Fort Lauderdale, FL (US)

(72) Inventors: Sai Xu, Nanjing (CN); Qin Zhang, Nanjing (CN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/854,221

(22) Filed: Apr. 21, 2020

(65) Prior Publication Data

US 2020/0252496 A1    Aug. 6, 2020

Related U.S. Application Data

(63) Continuation of application No. 16/223,421, filed on Dec. 18, 2018, now Pat. No. 10,681,205.

(51) Int. Cl.
| H04M 1/00 | (2006.01) |
| H04M 1/725 | (2021.01) |
| G06F 3/01 | (2006.01) |
| G06F 21/84 | (2013.01) |

(52) U.S. Cl.
CPC .......... *H04M 1/7258* (2013.01); *G06F 3/016* (2013.01); *G06F 21/84* (2013.01); *H04M 1/72577* (2013.01)

(58) Field of Classification Search
CPC .. H04W 12/06; H04W 12/12; H04M 1/72519
See application file for complete search history.

(56) References Cited

U.S. PATENT DOCUMENTS

| 6,188,309 B1 | 2/2001 | Levine |
| 2007/0281666 A1 | 12/2007 | Yoshida |
| 2010/0094532 A1 | 4/2010 | Vorona |
| 2014/0133671 A1 | 5/2014 | Son et al. |
| 2017/0061109 A1 | 3/2017 | Takenouchi |
| 2017/0163807 A1 | 6/2017 | Kumar et al. |
| 2018/0218120 A1 | 8/2018 | Canzoneri |

*Primary Examiner* — Matthew W Genack
(74) *Attorney, Agent, or Firm* — Fox Rothschild LLP; Robert J. Sacco; Carol E. Thorstad-Forsyth

(57) ABSTRACT

Systems and methods for controlling access to a computing device. The methods include: detecting, by a computing device in a first state, two or more user actions of tactile input applied to only one or more physical volume control buttons of a housing of the computing device; determining that the detected two or more user actions of the tactile input are valid based on a code sequence; and changing the first state of the computing device to a second state to enable use of at least one functionality of the computing device, in response to determining that the detected two or more user actions of the tactile input are valid.

20 Claims, 3 Drawing Sheets

SYSTEMS AND METHODS FOR CONTROLLING ACCESS TO A COMPUTING DEVICE

CROSS-REFERENCE TO RELATED APPLICATIONS

This application is a continuation of U.S. application Ser. No. 16/223,421, filed Dec. 18, 2018, the entirety of which is incorporated herein by reference.

BACKGROUND

Statement of the Technical Field

The present disclosure relates generally to mobile devices. More particularly, the present disclosure relates to implementing systems and methods for unlocking mobile devices.

Background

As communications technologies develop, smartphones have increasingly become a part of people's daily life. Such mobile devices allow users to record/input personal information or business-related information therein. Furthermore, mobile devices may utilize touch screens that are susceptible to unintentional activation or deactivation of functions due to unintentional contact with the touch screen. In order to protect the information stored in mobile devices and/or for unintentional activation of a touch screen mobile devices include a lock function which is activated upon satisfaction of predefined lock conditions.

Once locked, a mobile device may be unlocked by providing a code or password, facial recognition, fingerprint scan, or other biometric scans. Typically, authentication inputs sacrifice user friendliness (e.g., easy to input, easy to remember, etc.) for security level, or vice versa. For example, a fingerprint scan may be secure and require little memory recall from the user, but may frequently fail unless a user exactly replicates the position of his/her finger on the scanner each time the input is applied and ensures that the scanner and finger are each free of debris. Other biometric scans such as facial recognition or retina recognition often require additional hardware that may not be available for a given device.

SUMMARY

The present disclosure concerns implementing systems and methods for accessing a functionality of a computing device. The methods comprise: detecting, by a computing device in a first state, two or more user actions of tactile input applied to only one or more physical volume control buttons (e.g., by application of force) of a housing; determining whether the detected two or more user actions of the tactile input are valid; and in response to determining that the detected two or more user actions of the tactile input are valid based on a code sequence, changing the first state of the computing device to a second state to enable use of at least one functionality of the computing device. Optionally, the first state is a locked state and the second state is an unlocked state of the computing device. In some scenarios, the one or more physical volume control buttons include a volume increase button and/or a volume decrease button.

The two or more user actions may include, without limitation, a long press action on a volume increase button, a long press action on a volume decrease button, a short press action on a volume increase button, a short press action on a volume decrease button, a long press of the volume increase button and the volume decrease button together, a short press of the volume increase button and the volume decrease button together, or combinations thereof.

In certain scenarios, the method also comprises with the computing device being in the second state, enabling the one or more physical volume control buttons to adjust a volume of audio output from the computing device.

In those or other scenarios, the methods also comprise providing a tactile or auditory feedback to a user of the computing device indicative of the computing device has changed from the first state to the second state.

BRIEF DESCRIPTION OF THE DRAWINGS

The present solution will be described with reference to the following drawing figures, in which like numerals represent like items throughout the figures.

DETAILED DESCRIPTION

Figure 1:
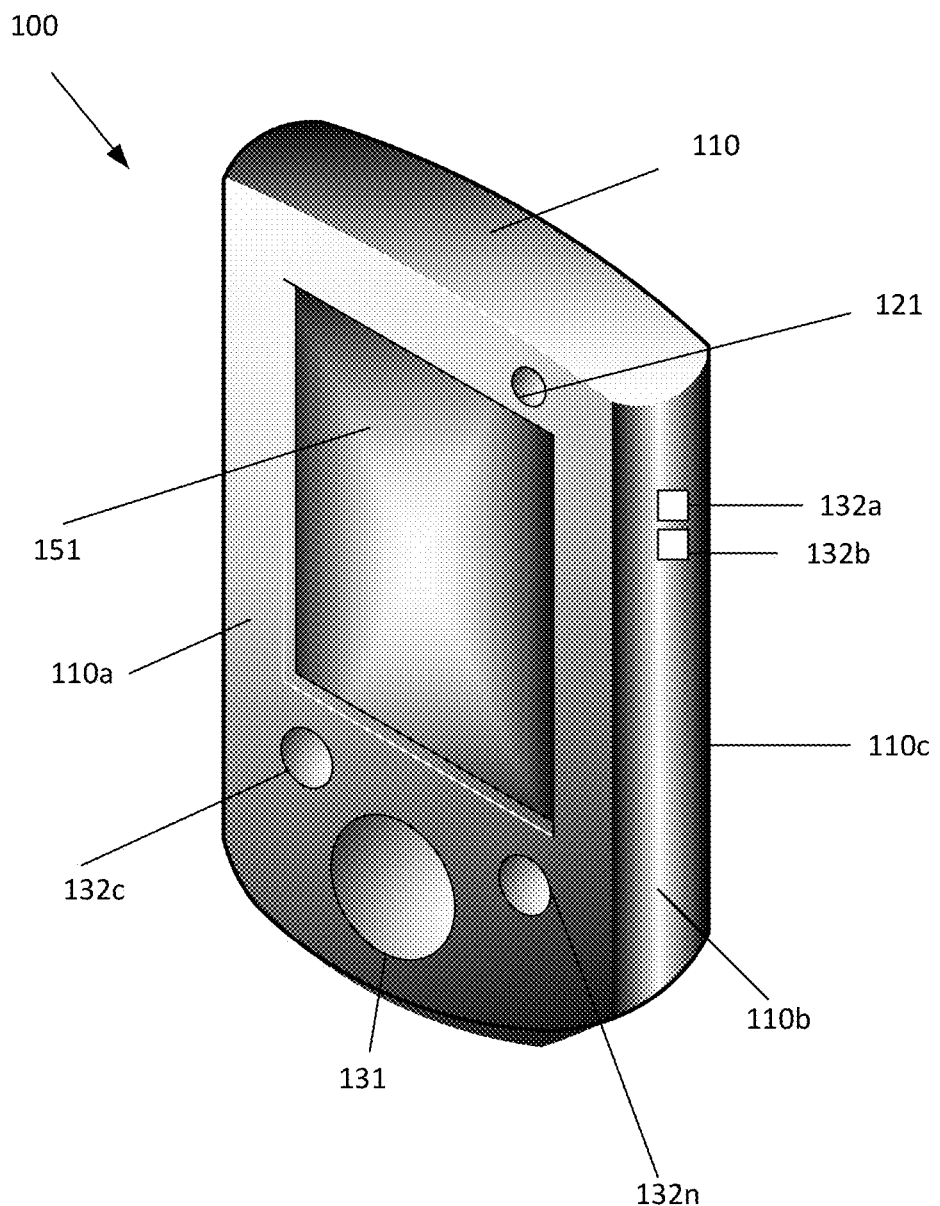
FIG. 1 is a front perspective view of an example mobile device according to the embodiments of the present disclosure.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The terms "computing device" and "electronic device" interchangeably refer to a device having a processor and a non-transitory, computer-readable medium (i.e., memory). The memory may contain programming instructions in the form of a software application that, when executed by the processor, causes the device to perform one or more processing operations according to the programming instructions. An electronic device also may include additional components such as a touch-sensitive display device that serves as a user interface, as well as a camera for capturing images. An electronic device also may include one or more communication hardware components such as a transmitter and/or receiver that will enable the device to send and/or receive signals to and/or from other devices, whether via a communications network or via near-field or short-range communication protocols. If so, the programming instructions may be stored on the remote device and executed on the processor of the computing device as in a thin client or Internet of Things (IoT) arrangement. Example components of an electronic device are discussed below in the context of FIG. 2. The term "mobile device" refers to a portable computing device, typically having a display screen with touch input and/or a miniature keyboard. Examples of mobile devices include, without limitation, smartphones, cellular phones, laptop computers, personal digital assistants, cameras, tablet devices, electronic readers, watches, fitness devices, media players, satellite navigation devices and the like.

The term "lock state" for a mobile device refers to a mobile device in which a variety of mobile device functions or operations have been locked from a user and/or cannot be accessed. Examples of such functions may include, without limitation, a device lock in which the device cannot be turned on and/or used, a memo set with a lock, a function for opening image files, video files, contact lists, schedules, a function for purchasing and/or accessing paid information, applications, and contents, or the like. In a locked state, the mobile device may have one or more screens (i.e. views on a display of the mobile apparatus) which may be shown to a user. A lock screen on a mobile device may be a display that appears when a device is in a lock state. The lock screen may have some information displayed, such as cellular signal strength, a wi-fi indicator, time and date information, etc. The lock screen may also refer to a state when the display is blank or off. Typically, from the lock screen, the user is not able to access the majority of applications available on the mobile device.

The terms "memory," "memory device," "computer-readable medium" and "data store" each refer to a non-transitory device on which computer-readable data, programming instructions or both are stored. Unless the context specifically states that a single device is required or that multiple devices are required, the terms "memory," "memory device," "computer-readable medium" and "data store" include both the singular and plural embodiments, as well as portions of such devices such as memory sectors.

A "processor" or "processing device" is a hardware component of an electronic device that is configured to execute programming instructions. The term "processor" may refer to a single processor or to multiple processors that together implement various steps of a process. Unless the context specifically states that a single processor is required or that multiple processors are required, the term "processor" includes both the singular and plural embodiments.

The term "unlock state" for a mobile device refers to a mobile device in which a variety of mobile device functions or operations are available to a user for use and/or access.

The current disclosure recognizes that while user-input access codes (such as a PIN or password) may be utilized to leverage a device's existing hardware and may be less prone to input error than biometric scans, they are susceptible to theft if entered in public. Various embodiments of the present disclosure describe systems and methods for unlocking a mobile device utilizing existing device hardware, and that provide a higher level of security to the mobile device.

The present disclosure will now be described in detail with reference to the figures. Referring now to FIG. 1, it illustrates a front perspective view of a mobile device 100. In an embodiment the mobile device 100 includes a housing 110, a display 151, and one or more physical input buttons 132 (132*a*, 132*b* . . . 132*n*).

While the mobile device 100 disclosed herein has a bar type mobile device shape and form, the present disclosure is not so limiting, and may be applicable to various types of mobile devices. Examples may include, without limitation, a mobile device having two or more bodies coupled to be relatively movable with each other (e.g., a slide type, a folder type, a swing type, a swivel type, etc.), and/or any other shape or form of a mobile device.

In certain embodiments, the mobile device housing 110 (hereinafter, referred to as 'housing') may be formed to include a front surface 110*a*, a side surface 110*b* and a rear surface 110*c*. Various electronic components may be mounted in a space between the front surface 100*a*, the side surface 110*b*, and the rear surface 100*c* (described below in detail in FIG. 2). In one or more embodiments, the mobile device housing 110 may be formed using a synthetic resin (e.g., molding) or be formed of a metal, such as stainless steel (STS), titanium (Ti) or the like.

In some embodiments, the display 151 may display various types of screens according to the use of the mobile device 100. The display 151 may be implemented with a display panel such as, without limitation a Liquid Crystal Display (LCD), Organic Light Emitted Diodes (OLEDs), Active Matrix Organic Light Emitted Diodes (AMOLEDs), a Thin Film Transistor-Liquid Crystal Display (TFT LCD), a flexible display, or a three-dimensional (3D) display, or the like. In one or more embodiments, the display 151 may include a touch screen that provides both an output interface and an input interface between the mobile device 100 and a user. A touch-screen controller (not shown here) may receive/send electrical signals from/to the touch screen. The touch screen may then display visual output to the user. The visual output may include text, graphics, video, and any combination thereof. As discussed above, the display 151 may be turned off during a lock state of the mobile device 100. Alternatively, the display 151 may be configured to output a lock screen that includes certain visual objects during a lock state of the mobile device 100. Examples of such visual objects may include, without limitation, a time and/or calendar display, instructions for unlocking the mobile device (e.g., a slider bar), battery life, one or more alerts, screen saver images, or the like.

In one or more embodiments, the one or more physical input buttons 132 (132a, 132b . . . 132n) may be configured to detect user actions relating to the instruction or data inputs for performing one or more functions of the mobile device 100. The physical input buttons 132 may be physical keys, buttons, switches, keyboards or other similar input devices. Specifically, the physical input buttons 132 are buttons on the mobile device 100 that are not touch sensitive and require application of some pressure or mechanical force to register a user action or input. The physical input buttons 132 have their respective predetermined or configurable functions (such as volume control, power on, home screen display, or the like) which may be defined by an operating system of the mobile device 100.

In one aspect, the physical input buttons 132 may be tactile buttons such that they may be configured to receive a mechanical force and to transfer the mechanical force to a piezoelectric element. A piezoelectric element detects pressure in response to force applied to the physical input buttons 132, and generates a voltage. In one aspect, the piezoelectric element may be lead zirconate titanate (also referred to as "PZT"). Therefore, as a user of the mobile device 100 presses one or more of buttons 132, the mechanical force applied for each user input may be harvested by converting the mechanical force to electrical energy. Alternatively, the physical input buttons 132 may be associated with other types of mechanical, optical, magnetic and/or other sensors configured to register the mechanical force applied.

In addition to the predetermined functions, the current disclosure describes systems and methods for extending the functionality of one or more physical input buttons 132 for unlocking the mobile device 100. The physical input buttons 132 have tangible physical structures, and thus it is more convenient for a user to operate these buttons 132 without actually looking at the buttons 132 (unlike a touch screen). For example, a user may be unlock the mobile device 100 without looking at it (e.g., when the mobile device is in a user's pocket) by operating the physical input buttons 132 in order to prevent others from discovering the user's password, in emergency situations, or the like. Also, as a further advantage of providing the physical structures, the physical input buttons 132 are more reliable in functionality and operation, providing robustness to the unlocking methods. Finally, physical input buttons 132 such as volume control buttons are typically included in all mobile devices unlike other sophisticated hardware required for biometric recognition, etc.). As such, systems and methods of the current disclosure can leverage existing mobile device features without the need for expensive re-design of the housing 110.

In certain embodiments, the lock state of the mobile device 100 may be used to lock part or all of the mobile device 100 from use and the code sequence may be used to unlock part or all of a device for use. For example, the mobile device 100 may be turned on or off, the key pad (e.g., the keys used for dialing) may be enabled or disabled, the touch screen user input interface of the mobile device 100 may be enabled or disabled, and/or dialing or sending a telephone number to initiate a call may be enabled or disabled while still permitting the device to receive and to answer an incoming call. The applications and functions of the mobile device 100 that are enabled and disabled by the unlocking and locking functions may be configurable by a user of the mobile device 100. While the current disclosure described unlocking of the mobile device 100 from a locked state using an unlocking signal received from the physical input buttons, other unlock methods (e.g., passcode entry, facial recognition, fingerprint scan, etc.) may be used in addition to and/or in lieu of the methods described herein. For example, the physical input button based unlocking may be used to unlock a first set of functions of the mobile device 100 (e.g., calling), and/or other methods may be used to unlock a different set of functions of the mobile device 100.

In one or more embodiments, activation of the lock state may occur upon satisfaction of any of one or more lock conditions. The lock conditions may include codes such as, without limitation, the elapsing of a predefined time of inactivity, entry into an active call, powering on the device from an off state, expiry of a time out period from the last time a user input was received, expiry of a time out period since last radio contact, expiry of a time in which mobile device is motionless, or the like. The lock conditions may also include user intervention, namely the user locking the mobile device 100 by a predefined user input. In some embodiments, the user may be allowed to specify the events that serve as lock conditions. For example, the user may configure the mobile device 100 to transition to the lock state upon the elapsing of a predefined time of inactivity but not upon powering on the mobile device 100.

In certain embodiments, the mobile device 100 may be configured to receive an unlock code based on user actions performed on the physical input buttons 132 (e.g., the volume control buttons 132a and 132b) when the mobile device is in a lock state by, for example, configuring the operating system of the mobile device 100. Upon configuration, the functions performed by one or more of physical input buttons 132 (e.g., volume control by the volume control buttons 132a and 132b) may be disabled during a lock state. Thus, the mobile device 100 does not need to determine that user inputs received via the physical input buttons 132 when the mobile device 100 is in a lock state is an unlock code and not a regular function. The mobile device 100 may receive the unlock code based on user actions performed on the physical input buttons 132, and may analyze the received signal to determine if it can be used for unlocking the mobile device, as discussed below. The mobile device 100 may also be configured to associate one or more codes (user actions such as short press-action, long press-action, or the like, described below) with the tactile force applied to the physical input buttons. The received code sequence may be stored in a memory (not shown here) of the mobile device 100. Alternatively and/or additionally, the mobile device 100 may be associated with a default code sequence.

A "user action" corresponds to application of force on a physical input button and may correspond to a code, where a code sequence is used to unlock the mobile device 100 from a lock state. Examples of user actions may include, without limitation, a short-press action (Code 1), a long-press action (Code 2), a medium-press action (Code 3), pressing of two or more physical input buttons simultaneously (Code "n"), etc., or combinations thereof. In some embodiments, the short-press action may be a press action performed for a first time period (e.g., about 0.1—about 1 second), a medium-press action may be a press action performed for a second time period (e.g., about 1—about 2 seconds), and a long-press action may be a press action performed for a third time period (e.g., 3 seconds or more, about 3 to about 5 seconds, etc.). However, the disclosure is not so limiting and other actions such as a very long-press action (longer than 10 seconds etc.), pressing multiple buttons, etc., may also be used as codes. As can be appreciated, greater possible variation in possible user actions or codes can enhance security.

For example, for a specific button such as the volume increase button, if the button is pressed for about 0.5 second before release of the button, then the mobile device may determine that a short-press action on the volume increase key is detected. Furthermore, for the volume increase key, if the button is released after 3 seconds, then the mobile device may determine that a long-press action on the volume increase key is detected.

One or more of the user actions may be associated with a command instead of a code. For example, pressing of two or more of the physical input buttons at the same time with a short-press, a long-press and/or irrespective of the press duration may be associated with, for example, a reset (to enter the code sequence again where all previous user-actions are ignored), backspace (where only the user action immediately before the combined press is ignored), enter (i.e., submit previous user actions as a code sequence for authentication), begin (i.e, the user actions following the current user actions provide the code sequence), or the like.

If a second or more user actions (i.e., pressing of the same or another physical input button) are detected within a defined time period after a first user action is detected, the mobile device 100 may determine the detection of a combination of user actions. The time period may be, for example, 0.5 to 2 seconds. For example, if a second short-press action is detected 1 second after a first short-press action is detected, then the mobile device determines that a combination of two short-press actions, i.e. a double short-press action, has been detected. The number of the combined user actions recognizable by the mobile device may be more than two, for example, three, four or even more.

In one or more embodiments, the number of combined user actions for forming a code sequence for unlocking the mobile device may be at least, 3, 4, 5, 6, or more. In a preferred embodiment, the number of combined user actions for forming a code sequence for unlocking the mobile device is at least 6. Hence, for a mobile device that recognizes a long-press action and a short press action with each of the volume control buttons (i.e., 4 codes-2 for each button), the total number of combinations is at least $4^6$ (i.e., 4096) combinations.

The mobile device 100 may initially receive the code sequence that unlocks the mobile device 100 from an unlock state, for storage, from the user using any now or hereafter known methods for receiving authentication information from a user. For example, a user may navigate to a security settings application or menu option on the device and may register a sequence of user actions (i.e., codes) to use as a future code sequence (for example, the $U_S$-$U_S$-$D_S$-$D_L$-$U_L$-$D_S$ sequence described below above could be entered). In an example embodiment, some feedback may be provided to the user in response to the user actions the user is inputting. The received code sequence is then stored in the mobile device 100 for future user for unlocking the mobile device 100 as described below. In some embodiments, double entry of the new code sequence may be required before the sequence is accepted and stored as the new code sequence for the mobile device. In some example embodiments, a minimum and/or maximum number of user actions (e.g., minimum 6) are required for a valid code sequence and proposed sequences that do not meet such requirements are rejected.

In the described embodiments, the physical input buttons 132 include volume control buttons—one for volume increase 132a and another for volume decrease 132b—that may be used to unlock the mobile device 100. The use of the volume control buttons 132a and 132b for unlocking the mobile device 100 provides several advantages. For example, the location of the volume control buttons 132a and 132b close to each other allows a user to operate them using one hand, one finger, and/or one thumb. Furthermore, the location of the volume control buttons 132a and 132b on the side surface 110b and away from the front surface 110a (that may include a touch screen display) prevents inadvertent operation by a user to unlock the mobile device. As an additional advantage, operation of the volume control buttons 132a and 132b for unlocking the mobile device 100 and for volume control requires the same user action (i.e., application of force to press the buttons), and therefore does not require user training. Finally, volume control buttons 132a and 132b are typically disabled from receiving user inputs for volume adjustments when the mobile device 100 is in a lock state. As such, the mobile device 100 does not need to distinguish between user inputs for volume adjustments and user inputs to unlock the mobile device 100 from a lock state.

In an embodiment, force may be applied to each volume control button (i.e., volume increase and volume decrease) as a single short-press action (Code 1), a single long-press action (Code 2) or a combination of the short-press actions and/or the long press actions. In at least one embodiment, pressing of both the buttons (volume increase and volume decrease) at the same time for a short-press and/or for a long-press may also be associated with codes. Alternatively and/or additionally, pressing of both the buttons (volume increase and volume decrease) at the same time with a short-press, a long-press and/or irrespective of the press duration may be associated with a command such as, for example, a reset (to enter the code sequence again where all previous user-actions are ignored), backspace (where only the user action immediately before the combined press is ignored), enter (i.e., submit previous user actions as a code sequence for authentication), or the like.

By way of illustrative example, a code sequence for unlocking a mobile device using the volume control buttons 132a and 132b, and including 6 user actions may be a code sequence of $U_S$-$U_S$-$D_S$-$D_L$-$U_L$-$D_S$ where "$U_S$" represents a short-press action on the volume up button, "$U_L$" represents a long-press action on the volume up button, "$D_S$" represents a short-press action on the volume down button, and "$D_L$" represents a long-press action on the volume down button. Thus, in the present example the code sequence includes a sequence of six distinct input codes occurring through a user action on the volume control buttons. Each of the input codes is selected from four possible options ($U_S$, $U_L$, $D_S$ or $D_L$) and if the mobile device user successfully performs those six input codes in the same sequence as in a stored code sequence, the mobile device will be unlocked.

In certain embodiments, the mobile device 100 may be configured to provide feedback to the user as a user-action (long press or short press) is performed. For example, an audible feedback such as a beep or other sound can be generated through a speaker of the mobile device 100 with each user action to provide feedback that the mobile device is treating the user action as input code for a code sequence. In some configurations, an audible sound could be generated when the feedback is provided upon each user action, upon receipt of the complete code sequence (i.e., 6 user actions in the above example), and/or indicate a successful match and unlocking of the device or a failed entry (with different sounds being used for each). In some embodiments, other feedback methods such as, without limitation, vibration, visual feedback, or the like, could also be provided, either in combination with audible feedback or in the absence of audible feedback.

It will be understood to those skilled in the art that while the following discussion describes a method for unlocking the mobile device 100 from a lock state using the volume control buttons 132a and 132b, the disclosure is not so limiting and the mobile device 100 may be unlocked using any of the physical input buttons 132 (132a, 132b . . . 132n). For example, a home button (132c) or a lock button (not shown) may be used in lieu of and/or in addition to the volume control buttons 132a and 132b. Additionally and/or alternatively, any number of physical input buttons 132 (132a, 132b . . . 132n) may be used for unlocking the mobile device 100 from a lock state, such as without limitation, 1 (e.g., pressing a single volume control button in a defined pattern), 2, 3, 4 or more buttons.

While FIG. 1 shows that the volume control buttons 132a and 132b of the mobile device 100 are located on one side of the mobile device the disclosure is not so limiting, and the volume control buttons 132a and 132b may be located anywhere on the housing 110 of the mobile device 100 such as, without limitation, on a top surface, bottom surface, front surface, back surface, or the like. Each of the buttons 132a and 132b may be configured to perform one or more functions of the mobile device 100. For example, button 132a may be configured to increase the volume of the mobile device 100, button 132b may be configured to decrease the volume of the mobile device 100, and buttons 132a and 132b may be configured to unlock the mobile device 100, as discussed below.

Furthermore, while the above disclosure describes that the physical input buttons 132 are included in the mobile device housing 120, some physical input buttons 132 may be formed as separate components, which are releasably attached to the mobile device 100. For example, the volume control buttons may be formed as volume adjusting keys integrated within an earphone line attachable to the mobile device 100 via an earphone connection port.

Referring back to FIG. 1, in at least one embodiment, the mobile device hosing 110 may further include optional components such as, without limitation, a camera 121, a user interface fingerprint reader 131, an audio output module (not shown here), a microphone (not shown here), a power port (not shown here), and the like.

Figure 2:
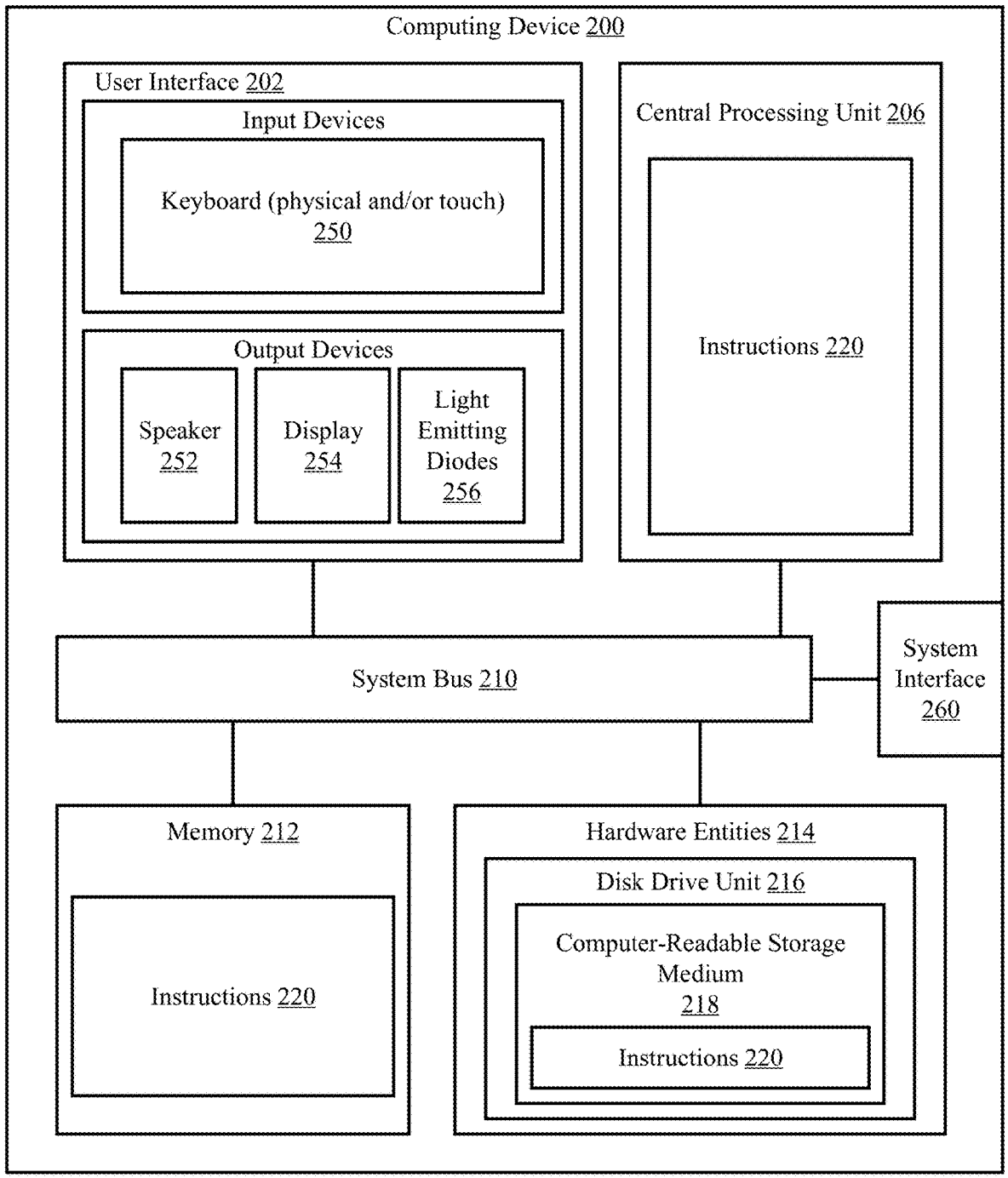
FIG. 2 is an illustration of example hardware components included an example mobile device according to the embodiments of the present disclosure.

Referring now to FIG. 2, a block diagram illustrating the architecture for the mobile device 100 is shown. Mobile device 100 may include more or less components than those shown in FIG. 2. However, the components shown are sufficient to disclose an illustrative architecture implementing the present solution. The hardware architecture of FIG. 2 represents one implementation of a representative mobile device configured to provide an unlock functionality using physical input buttons, as described herein. As such, the mobile device 100 of FIG. 2 implements at least a portion of the method(s) described herein.

Some or all components of the mobile device 100 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 2, the mobile device 100 comprises a user interface 202, a Central Processing Unit ("CPU") 206, a system bus 210, a memory 212 connected to and accessible by other portions of mobile device 100 through system bus 210, a system interface 260, and hardware entities 214 connected to system bus 210. The user interface 202 can include input devices and output devices, which facilitate user-software interactions for controlling operations of the mobile device 100. The input devices include, but are not limited, a physical and/or touch keyboard 250. The input devices can be connected to the mobile device 100 via a wired or wireless connection (e.g., a Bluetooth® connection). The output devices include, but are not limited to, a speaker 252, a display 254, and/or light emitting diodes 256. System interface 260 is configured to facilitate wired or wireless communications to and from external devices (e.g., network nodes such as access points, etc.).

At least some of the hardware entities 214 perform actions involving access to and use of memory 212, which can be a Radom Access Memory ("RAM"), a solid-state or disk driver and/or a Compact Disc Read Only Memory ("CD-ROM"). Hardware entities 214 can include a disk drive unit 216 comprising a computer-readable storage medium 218 on which is stored one or more sets of instructions 220 (e.g., software code) configured to implement one or more of the methodologies, procedures, or functions described herein. The instructions 220 can also reside, completely or at least partially, within the memory 212 and/or within the CPU 206 during execution thereof by the mobile device 100. The memory 212 and the CPU 206 also can constitute machine-readable media. The term "machine-readable media", as used here, refers to a single medium or multiple media (e.g., a centralized or distributed database, and/or associated caches and servers) that store the one or more sets of instructions 220. The term "machine-readable media", as used here, also refers to any medium that is capable of storing, encoding or carrying a set of instructions 220 for execution by the mobile device 100 and that cause the mobile device 100 to perform any one or more of the methodologies of the present disclosure.

Figure 3:
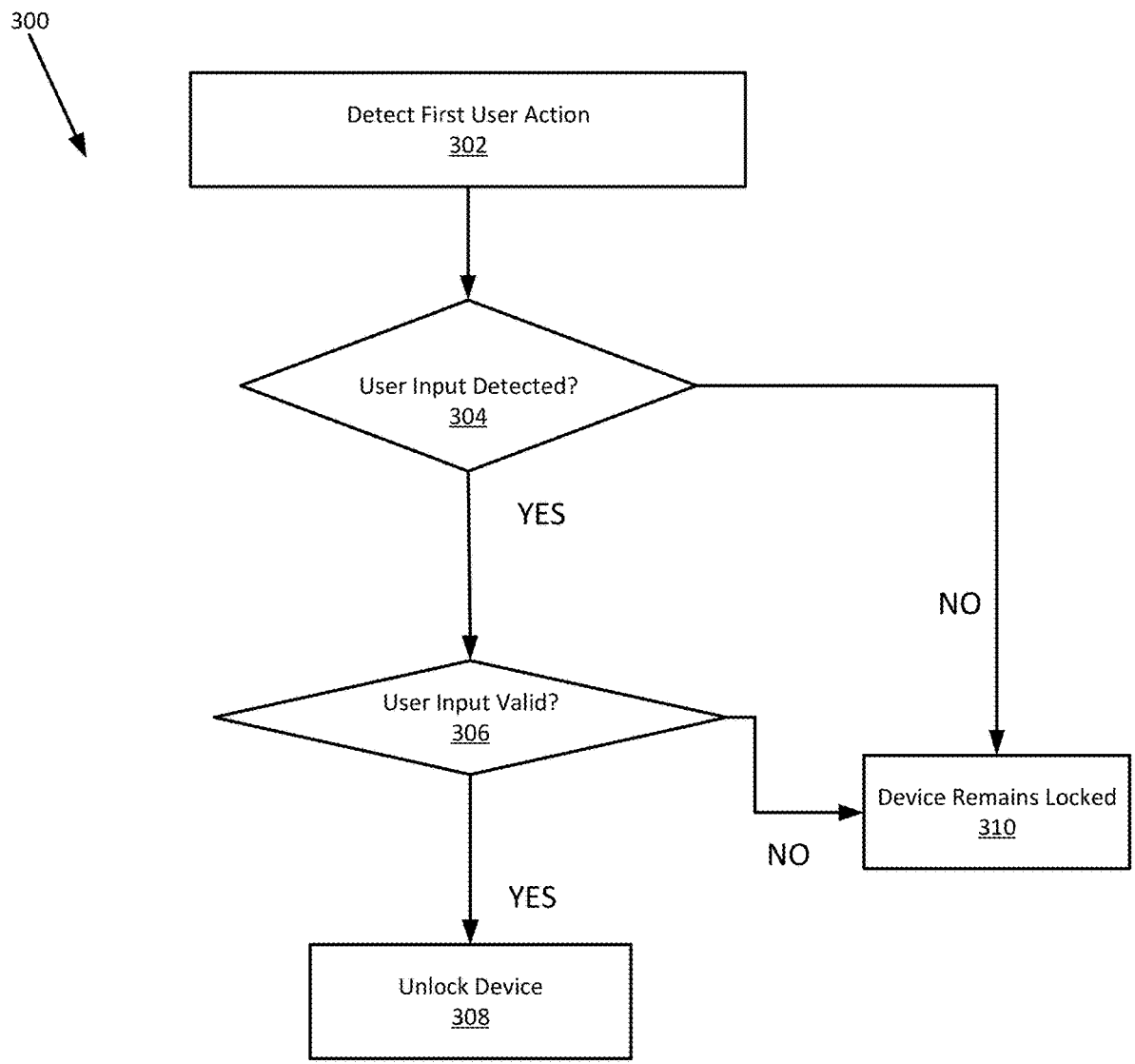
FIG. 3 is a flow chart illustrating an example method for unlocking a mobile device according to the embodiments of the present disclosure.

Referring now to FIG. 3, an exemplary flowchart in accordance with various embodiments illustrating and describing a method of unlocking a mobile device from a lock state is described. While the method 300 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 3 but the process may be integrated and/or one or more steps may be performed together, simultaneously, or the steps may be performed in the order disclosed or in an alternate order.

While in the locked state, the mobile device may detect a first user action (302) performed on one or more physical input buttons. The physical input buttons, as described above, are interfaces which require application of some pressure or mechanical force to register a user action (e.g., pressing the volume control buttons). As such, the mobile device may detect the user action if, for example, a user applies force to a physical input button by pressing the button.

Upon detecting the user action, the mobile device may monitor the physical input buttons to determine (304) whether a user input is detected, where a user input includes a two or more user actions performed on the physical input buttons. The mobile device may determine that a user input is received if a second or more user actions (i.e., pressing of the same of another physical input button) are detected after the first user action until a stop monitoring event occurs. Examples of the stop monitoring event may include, without limitation, end of a defined time period after the first user action (with or without receiving additional user actions), receipt of a required number of user-actions or codes (e.g., 6 in the above example of $U_S$-$U_S$-$D_S$-$D_L$-$U_L$-$D_S$) without a pause that is greater than a first time period (e.g., 0.5 to 2 seconds), receipt of a pause that is longer than the defined time period between user actions, receipt of another user action corresponding to a command indicating that the code sequence is complete is received (e.g., pressing of both volume control buttons), or the like.

The number of user actions in a user input may be more than one, for example, two, three, four or even more. In certain embodiments, the number of user actions in a user input may be equal to the number of user actions that form an unlock code of the mobile device.

If a user input is not detected (304: NO) (for example, if the first or more user actions were performed unintentionally and no other user action is detected within the defined time period), the mobile device stays unlocked (310).

However, if a user input is detected (304: YES), the mobile device may analyze the user input to determine whether the user input is valid for unlocking the mobile device (306). The mobile device may determine that the user input is a valid user input if it matches a stored code sequence required for unlocking the mobile device. In certain embodiments, the stored code sequence may include a sequence of user actions performed on the physical input buttons in a pre-defined pattern, as discussed above.

If the user input is valid (306: YES), the mobile device is unlocked (308), otherwise (306: NO), the device remains locked (310).

It should be noted that receiving the code sequence based on user actions performed on the physical input buttons (e.g., volume control buttons) does not require that the user look at the mobile device to observe its display or keyboard, but rather provides an unlock method that the user can carry out through feel alone without looking at the mobile device. In some example embodiments, as described above, an audible feedback may be provided to assist the user in the "vision free" code sequence entry process. Such a code sequence entry process using the physical input buttons (e.g., volume control buttons), as disclosed herein, may also permit the mobile device user to prevent others from discovering the user's password by watching which keys are depressed. This could be achieved, for example, by the device user putting both the mobile device as well as his or her hand in a pocket, and then entering the code sequence while the mobile device is concealed by the pocket.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method, comprising:
   detecting, by a computing device in a first state, two or more user actions of tactile input applied to only one or more physical volume control buttons of a housing of the computing device;
   determining that the detected two or more user actions of the tactile input are valid based on a code sequence; and
   in response to determining that the detected user actions are valid, changing the first state of the computing device to a second state to enable use of at least one functionality of the computing device.

2. The method according to claim 1, wherein the first state is a locked state of the computing device, the second state is an unlocked state of the computing device, and the two or more user actions of the tactile input is a code sequence that initiates a change of state of the computing device from the locked state to the unlocked state.

3. The method according to claim 1, wherein the two or more user actions of the tactile input are selected from the group comprising: a long press action on a volume increase button, a long press action on a volume decrease button, a short press action on a volume increase button, a short press action on a volume decrease button, a long press of the volume increase button and the volume decrease button together, a short press of the volume increase button and the volume decrease button together, or a combination thereof.

4. The method according to claim 1, further comprising providing a tactile or auditory feedback to a user of the computing device, the feedback indicative of the computing device has changed from the first state to the second state.

5. The method according to claim 1, further comprising with the computing device being in the first state, locking a touch screen of the computing device and disabling the one or more physical volume control buttons, the disabled volume control buttons configured to no longer adjust a volume of audio output from the computing device.

6. The method according to claim 5, further comprising with the computing device being in the second state, enabling the one or more physical volume control buttons to adjust a volume of audio output from the computing device.

7. The method according to claim 1, wherein the two or more user actions of tactile input comprises vision-free code sequence entry into the computing device without the use of a touch screen of a display of the housing.

8. A computing device, comprising:
   a housing;
   a speaker;
   one or more physical volume control buttons of the housing; and
   a processor, within the housing, configured to:
      detect two or more user actions of tactile input applied to only one or more physical volume control buttons of the housing, wherein:
         the one or more physical volume control buttons are configured to enter a pin code in a first state and control a volume of the speaker in a second state, the first state and the second state are different states, determine that the detected two or more user actions of the tactile input are valid based on a pin code sequence, and in response to determining that the detected user actions are valid, enable access to at least one functionality of the computing device.

9. The computing device according to claim 8, wherein the first state is a locked state to the at least one functionality of the computing device, the second state is an unlocked state of the computing device, and the two or more user actions of the tactile input is a pin code sequence that initiates a change of state of the computing device from the locked state to the unlocked state.

10. The computing device according to claim 8, wherein the two or more user actions of the tactile input are selected from the group comprising: a long press action on a volume increase button, a long press action on a volume decrease button, a short press action on a volume increase button, a short press action on a volume decrease button, a long press of the volume increase button and the volume decrease button together, a short press of the volume increase button and the volume decrease button together, or a combination thereof.

11. The computing device according to claim 8, further comprising a display having a touch screen, the touch screen being locked in the first state and wherein the processor is further configured to provide an auditory feedback to a user, via the speaker, the feedback being indicative of each tactile input on the one or more physical volume control buttons being treated as input of the pin code.

12. The computing device according to claim 8, wherein the processor is further configured to, with the computing device being in the second state, provide a tactile or auditory feedback to a user of the computing device, the feedback indicative that the computing device has changed from the first state to the second state.

13. The computing device according to claim 12, further comprising a display having a touch screen, the touch screen being locked in the first state.

14. The computing device according to claim 13, wherein the two or more user actions of tactile input comprise vision-free code sequence entry of the pin code without use of the touch screen.

15. A computing device having at least one functionality with controlled access, the computing device comprising:

a housing including a touch screen, a speaker and one or more physical volume control buttons configured to enter a pin code in a first state and control a volume of the speaker in a second state, the first state and the second state are different states; and a processor, within the housing, configured to:
detect two or more user actions of tactile input applied to only the one or more physical volume control buttons, during the first state,
determine a pin code sequence has been entered in response to the detected two or more user actions of the tactile input; and
in response to determining that the pin code sequence has been entered, enable access to the at least one functionality.

16. The device according to claim 15, wherein the first state is a locked state to the at least one functionality, the second state is an unlocked state of the at least one functionality, and the two or more user actions of the tactile input initiates a change of state from the locked state to the unlocked state.

17. The device according to claim 15, wherein the processor is further configured to provide an auditory feedback to a user, via the speaker, the feedback being indicative of each tactile input on the one or more physical volume control buttons being treated as input of the pin code sequence.

18. The device according to claim 15, wherein the processor is further configured to provide a tactile or auditory feedback to a user of the computing device, the feedback indicative that the computing device has changed from the first state to the second state.

19. The device according to claim 18, wherein the processor is further configured to lock the touch screen in the first state.

20. The device according to claim 19, wherein the two or more user actions of tactile input comprise vision-free code sequence entry of the pin code sequence without use of the locked touch screen.

* * * * *